(12) United States Patent
Schumacher (10) Patent No.: US 6,978,265 B2
(45) Date of Patent: Dec. 20, 2005

(54) SYSTEM AND METHOD FOR MANAGING INFORMATION FOR A PLURALITY OF COMPUTER SYSTEMS IN A DISTRIBUTED NETWORK

(75) Inventor: Michael K. Schumacher, Waterford, MI (US)

(73) Assignee: Lakeside Software, Inc., Keego Harbor, MI (US)

( * ) Notice: Subject to any disclaimer, the term of this patent is extended or adjusted under 35 U.S.C. 154(b) by 411 days.

(21) Appl. No.: 10/047,866

(22) Filed: Jan. 15, 2002

(65) Prior Publication Data

US 2002/0099690 A1 Jul. 25, 2002

Related U.S. Application Data

(60) Provisional application No. 60/262,134, filed on Jan. 16, 2001.

(51) Int. Cl.[7] ............................................. G06F 17/30
(52) U.S. Cl. ........................... 707/4; 707/10; 707/100; 379/112.01; 379/114
(58) Field of Search .................... 707/1–206, 501–513; 379/112.01, 114.01, 114

(56) References Cited

U.S. PATENT DOCUMENTS

| | | | |
|---|---|---|---|
| 5,630,125 A | 5/1997 | Zellweger | 707/103 |
| 5,905,988 A | 5/1999 | Schwartz | 707/104 |
| 5,958,012 A | 9/1999 | Battat et al. | 709/224 |
| 5,961,594 A | 10/1999 | Bouvier et al. | 709/223 |
| 5,987,454 A * | 11/1999 | Hobbs | 707/4 |
| 5,996,012 A | 11/1999 | Jarriel | 709/226 |
| 6,061,675 A | 5/2000 | Wical | 706/45 |
| 6,154,213 A | 11/2000 | Rennison et al. | 345/854 |
| 6,175,832 B1 | 1/2001 | Luzzi et al. | 707/10 |
| 6,263,433 B1 | 7/2001 | Robinson et al. | 713/100 |
| 6,282,712 B1 | 8/2001 | Davis et al. | 717/170 |
| 6,396,913 B1 * | 5/2002 | Perkins, III | 379/112.01 |
| 2002/0055932 A1 * | 5/2002 | Wheeler et al. | 707/104.1 |

* cited by examiner

*Primary Examiner*—Charles Rones
*Assistant Examiner*—Belix M. Ortiz
(74) *Attorney, Agent, or Firm*—Dykema Gossett PLLC (57) ABSTRACT

A system for managing computers in a distributed computer network includes a collection agent for each computer being monitored, a local database coupled to each collection agent, one or more condensing agents coupled to the databases, and at least one console module. The condensing agent generates an index table from a source database and sends it upstream to the next level up in the hierarchy of databases. Other condensing agents may in turn act on this index table and send it up to a still further level, until a top-level master node has an index table reflecting the entire network. The console can use the index table to identify what databases contain needed data, and then make only selective connections to databases to answer queries, avoiding connections to all the local databases. The condensing agent also produces summarized data and sends it upstream as well, to be used by the console. Efficiency is improved over conventional systems. Use of the index method and the summary method can be transparent to (hid from) the user of the console, or may be made visible, with selection options.

15 Claims, 6 Drawing Sheets

| L1 | L2 | L3 | ... | L16 | CONN_STR | RECTYPE | NAME1 | NAME2 |
|---|---|---|---|---|---|---|---|---|
| CHRISTINE | | | | | LPISLMLLHUHUG | 2 | CHRISTINE | ServerNT |
| CHRISTINE | | | | | LPISLMLLHUHUG | 5 | LSI | Administrator |
| CHRISTINE | | | | | LPISLMLLHUHUG | 3 | 68 | |
| CHRISTINE | | | | | LPISLMLLHUHUG | 3 | 67 | |
| CHRISTINE | | | | | LPISLMLLHUHUG | 4 | 3Com EtherLink PCI | |
| CHRISTINE | | | | | LPISLMLLHUHUG | 5 | CHRISTINE | SYSTEM |
| CHRISTINE | | | | | LOIGNPLUGQGP | 1 | | |
| DB_DEAN | DEAN | | | | LOINKNLKGRGT | 2 | DEAN | WinNT |
| DB_DEAN | DEAN | | | | LOINKNLKGRGT | 5 | DEAN | SYSTEM |
| DB_DEAN | DEAN | | | | LOINKNLKGRGT | 3 | 68 | dean |
| DB_DEAN | DEAN | | | | LOINKNLKGRGT | 5 | LSI | |
| DB_DEAN | DEAN | | | | LOINKNLKGRGT | 3 | 67 | |
| DB_DEAN | DEAN | | | | LOINKNLKGRGT | 4 | FE575 Ethernet Adapter | |
| DB_KEN | | | | | LUIMNRLNGOGK | 1 | | |
| DB_KEN | KEN | | | | LUIMNRLNGOGK | 2 | KEN | WinNT |
| DB_KEN | KEN | | | | LUIMNRLNGOGK | 5 | KEN | SYSTEM |
| DB_KEN | KEN | | | | LUIMNRLNGOGK | 3 | 67 | |
| DB_KEN | KEN | | | | LUIMNRLNGOGK | 4 | 3Com 3c90x Ethernet Adapter | |
| DB_KEN | | | | | LOIGNPLPGUHQ | 1 | | |
| DB_KEN | DB_CARRIE | CARRIE | | | LVIJLKKOGMGTG | 2 | CARRIE | WinNT |
| DB_KEN | DB_CARRIE | CARRIE | | | LVIJLKKOGMGTG | 2 | CARRIE | SYSTEM |
| DB_KEN | DB_CARRIE | CARRIE | | | LVIJLKKOGMGTG | 3 | 67 | |
| DB_KEN | DB_CARRIE | CARRIE | | | LVIJLKKOGMGTG | 4 | FE575 Ethernet Adapter | |
| DB_KEN | DB_CARRIE | CARRIE | | | LVIJLKKOGMGTG | 5 | LSI | Carrie |
| DB_KEN | DB_MIKESWME | | | | LOIGNPLNGMGJ | 1 | | |
| DB_KEN | DB_MIKESWME | MIKESWME | | | LHIRKTLVHSHVG | 2 | MIKESWME | WinNT |
| DB_KEN | DB_MIKESWME | MIKESWME | | | LHIRKTLVHSHVG | 2 | MIKESWME | SYSTEM |
| DB_KEN | DB_MIKESWME | MIKESWME | | | LHIRKTLVHSHVG | 5 | LSI | mikes |
| DB_KEN | DB_MIKESWME | MIKESWME | | | LHIRKTLVHSHVG | 5 | MIKESWME | NETWORK SERVICE |
| DB_KEN | DB_MIKESWME | MIKESWME | | | LHIRKTLVHSHVG | 3 | 67 | |
| DB_KEN | DB_MIKESWME | MIKESWME | | | LHIRKTLVHSHVG | 4 | Intel 8255x-based PCI Ethernet Adapter [10_100] | |
| DB_KEN | DB_MIKESWME | MIKESWME | | | LHIRKTLVHSHVG | 5 | MIKESWME | LOCAL SERVICE |
| DB_KEN | DB_MARTINA | | | | LUIMNRLHGSHO | 1 | | |
| DB_KEN | DB_MARTINA | MARTINA | | | LNILLMKOGKGK | 2 | MARTINA | WinNT |

SYSTEM AND METHOD FOR MANAGING INFORMATION FOR A PLURALITY OF COMPUTER SYSTEMS IN A DISTRIBUTED NETWORK

RELATED APPLICATIONS

This application claims the benefit of U.S. provisional application, Ser. No. 60/262,134, filed Jan. 16, 2001, which is hereby incorporated by reference in its entirety.

BACKGROUND OF THE INVENTION

1. Technical Field

The present invention relates generally to computing systems and, more particularly to a system and method for managing a plurality of computers in a distributed computing network.

2. Discussion of the Related Art

It is known to provide a distributed computing network in which server computers and workstation computers are organized in a hierarchical manner. In this regard, it is also known to segregate the network into multiple domains, for example, each controlled by a Primary Domain Controller (PDC) provided as a network server, which may handle user logins, rights, and the like. Administrators of such large distributed networks desire the ability to manage all of its constituent computer systems by way of a single, unified console. Such administrators further desire the ability to "drill down" to view details related to individual systems, yet have the ability to see the "big picture" through analysis of the behavior of groups of systems. The existing art has provided a number of different management systems that can, in general terms, satisfy the foregoing. However, such systems have various shortcomings.

One general group of conventional management systems are referred to as "point management" systems. In one implementation of point management systems, a centralized database model is used wherein agents collecting data on the monitored systems forward the collected data up to the centralized database. However, such an implementation presents inherent limitations in terms of scalability. Specifically, taken to its logical conclusion, the implementation results in an extremely large database, which wastes resources and unreasonably extends query times on the database. These characteristics are undesirable, and may be unacceptable in many circumstances. In addition, the process of forwarding collected data over the distributed network results in extremely high network traffic, which is also undesirable for a management system as it denies the users of the network access to the bandwidth, and, in any event, results in slow response times for the management system itself.

Another implementation taken by "point" management systems involves direct connectivity with the agents that collect data on the monitored computer systems. However, this implementation also has limitations inasmuch as the effectiveness of the management console is strictly dependent on the connectivity capabilities to the monitored systems. For example, computer systems that are "off" or "disconnected" are inaccessible. Additionally, the direct connectivity model also exhibits extremely high network traffic.

Another approach taken in the art for management systems that can manage a large number of computers are referred to as "framework systems." Framework systems conventionally require that a management console maintain direct connectivity with the agents that collect data on the monitored systems, as described above in regard to the "point" management systems. Such "framework" systems are also known to retrieve or "pull" data from all the monitored systems and store the same in a centralized database, for example, such as Microsoft's SYSTEMS MANAGEMENT SERVER (SMS). Another implementation of conventional "framework" system employs a so-called "directory" approach. The "directory" approach is where each of the monitored systems maintains its own individual database, which is accessed by the console when information concerning the monitored system is desired. Applicant believes systems such as Computer Associate's UNICENTER or IBM's TIVOLI management system basically fall into this category. Conventional "framework" systems thus have the same shortcomings as the "point" management systems, namely, either a centralized "pull" model which leads to large databases, long query times, and high network traffic, or, depends highly on direct connectivity with the monitored systems across the distributed network.

There is therefore a need for an improved system and method for managing a plurality of computers in a distributed network that minimizes or eliminates one or more of the shortcomings as set forth above.

SUMMARY OF THE INVENTION

One object of the present invention is to solve one or more of the shortcomings set forth above in the Background. Another object of the present invention is to provide a more efficient method of managing a plurality of computers over a distributed network. These and other objects are realized through a system and method of managing a plurality of computers in a distributed network. The invention allows a large number of computer systems to be managed as a whole from one or more console locations, while allowing "drill-down" capabilities to individual systems. The invention also provides a unified view of the distributed network, all while requiring very little network bandwidth.

In one aspect of the invention, a method is provided for managing a plurality of computers accessible over a distributed network and involves four basic steps. First, collecting original data relating to each computer and storing the original data in respective storage databases. Next, generating an index table including index data for each computer wherein the index data is configured to (i) identify the contents of the original data and (ii) facilitate access to storage databases over the distributed network. The third step involves scanning at least one of the index tables to select which ones of the plurality of storage databases contain the original data that could be used to answer a user query. In one embodiment, the storage databases are arranged in a tree style hierarchy wherein each database in the hierarchy contains respective index data regarding databases below it in the tree. The final step involves accessing the selected storage databases to retrieve the original data and generate an output therefrom.

In a preferred embodiment, the accessing step is performed via a console module, executing at a top-level master node in the hierarchy. Maintaining the index data at each database in the hierarchy allows the console module to connect to databases at any point in the hierarchy, without having to connect to all of the databases, which preserves efficiency and overcomes the limitations of conventional systems.

In a still further preferred embodiment, the index data is produced by a condensing agent, acting on the original data in a first database with which it is associated. The index data is then sent upstream in the hierarchy to a second database immediately above it in the tree. The condensing agent at the next level up may in turn act on both the original data in the second database as well as the index data received from the level below. The newly formed index data is sent further upstream, and so on, until the top-level master node is reached. This mechanism is how the index data, at any particular level in the hierarchy, reflects all the computers below it in the hierarchy.

In a further aspect of the invention, the method includes the further step of producing summarized data for each computer. The summarized data includes records containing summarized information indicative of, for example only, application program usage, for various groups of systems from the databases logically below it in the hierarchy. The step of producing the summarized data may include, in a preferred embodiment, the substep of summarizing respective application program usage data from application tables that are lower in the hierarchy, and passing the summarized information upstream to an application table higher in the hierarchy. Summarizing data and passing such data upstream provides the console module with the novel capability of simply connecting to one summarized data table. This allows efficient resolution of many user queries without having to drill down to (i.e., connect to) a large number of monitored systems to retrieve the original data.

An apparatus corresponding to the method is also presented.

DETAILED DESCRIPTION OF THE PREFERRED EMBODIMENTS

Figure 1:
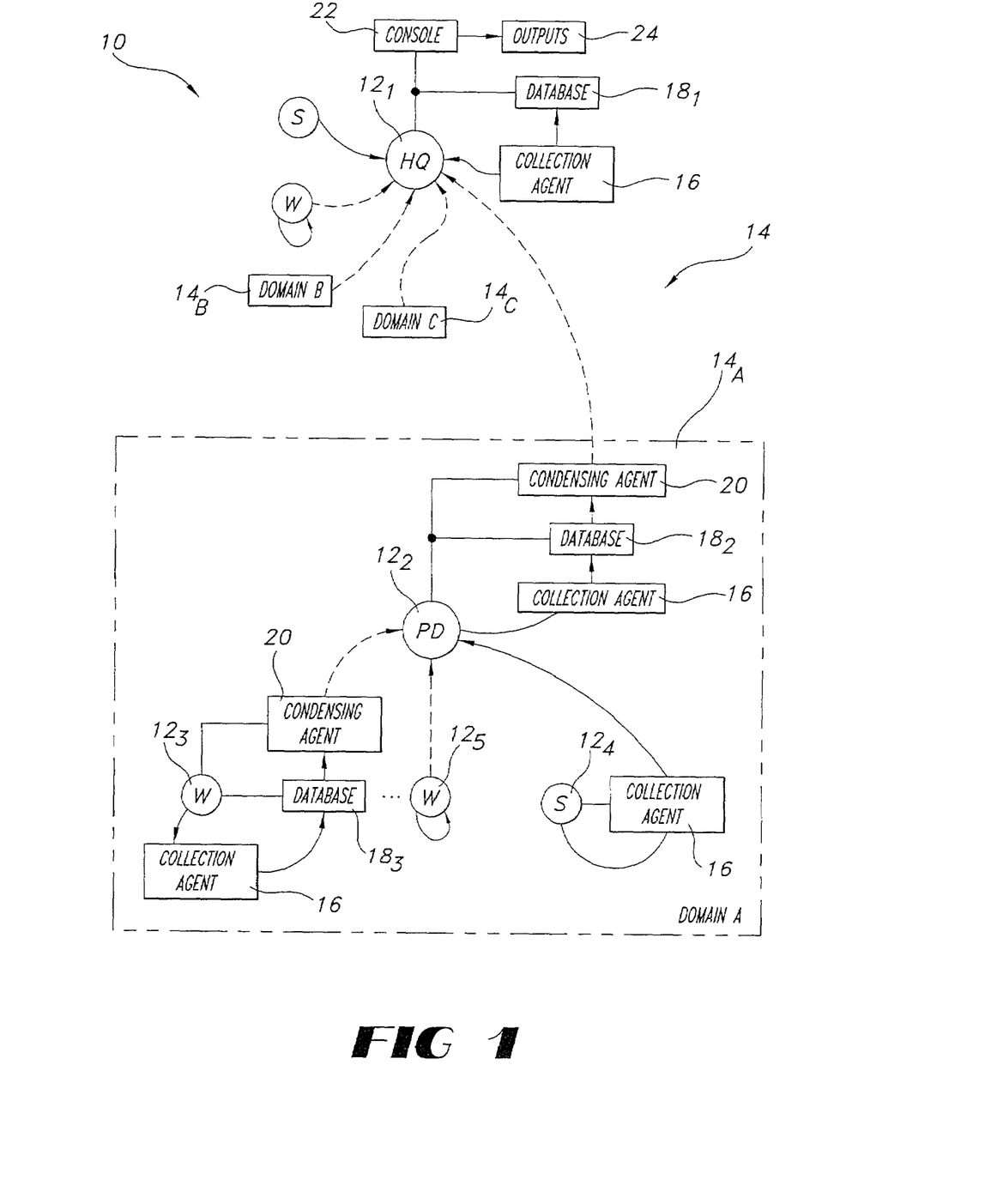
FIG. 1 is a simplified block diagram view of a distributed computing network according to the invention.

Referring now to the drawings wherein like reference numerals are used to identify identical components in the various views, FIG. 1 shows an apparatus 10 for managing a plurality of computers which are designated $12_1, 12_2, \ldots 12_n$, deployed in a distributed network 14. Distributed network 14 may include one or more domains, such as Domain A, designated $14_A$, Domain B, designated $14_B$, and Domain C, designated $14_C$. Computers $12_1, 12_2, \ldots 12_n$ may comprise conventional server computers and workstation computers. As illustrated in FIG. 1, computers $12_1, 12_2, \ldots 12_n$ may be arranged in an hierarchical relationship, wherein computer $12_1$ may be a top-level master node (e.g., at a headquarters location), computer $12_2$ may be a primary database (PD) for Domain A (a parent node from which one or more branches extend), and computers $12_3, 12_4,$ and $12_5$ may be a workstation computer ("W"), a server computer ("S"), and another workstation computer, respectively. Although a tree-style hierarchical arrangement is shown in FIG. 1, the present invention is not so limited, and may be applied to other topologies (e.g., ring, star, etc.). FIG. 1 also shows a plurality of collection agents 16, a corresponding plurality of databases $18_1, 18_2,$ and $18_3$, a plurality of a condensing agents 20, a console module 22, and an output block 24.

Computer systems 12 may comprise any conventional computing apparatus, and, in one embodiment, may comprise a Windows-based computer. It should be understood, however, that the present invention is not so limited. Computers 12 may be based on other widely available operating systems, such as, but not limited to, Unix-based systems, Linux-based systems, and Apple Macintosh-based systems.

Before proceeding to a detailed description of the present invention, it bears emphasizing that conventional management systems, as described in the Background, either "pull" all the information from and throughout the distributed network into a centralized database, or, alternatively, provide a multitude of individual databases, one for each monitored system, and to which a central console stays connected for information. These systems have the disadvantages of having either a large central database, and thus very slow query times, or, rely on ongoing connectivity throughout the distributed network. Both these systems experience the shortcoming of high network traffic.

The present invention, as seen by the user of console 22, appears to be a single, large database containing information on the monitored computers 12. However, the invention in actuality comprises a plurality of databases, preferably arranged in a hierarchy with a plurality of levels, although other organizations are possible. Each of the databases in the hierarchy contains index data reflecting the computers (and subsystems and users thereof) below it in the tree, as well as summarized information that statistically represents groups of systems, drawn from the databases below it in the tree. In a first mode of operation, a console module may connect to one database at a certain level in the hierarchy to use the summary information to answer queries about the computer systems below it, without having to connect to a potentially large number of databases. For example, where the query would otherwise be too inefficient because it would have to connect to a large percentage of the databases (e.g., who uses Microsoft Word?). In a second mode, the console uses index data to locate which databases in the hierarchy contain relevant information, and then further uses connection information in the index data to connect to only those databases to answer a query (to preserve efficiency, namely, to reduce database size and network traffic).

With continued reference to FIG. 1, data collection agent 16 is configured to acquire and store original data in the database 18 that is associated with it. Collection agent 16, in one embodiment, is configured to collect information about systems, disks, network interfaces, application programs and usage thereof, and users on the computer system 12 on which the agent has been deployed. The original data is collected by collection agent 16 using a variety of mechanisms and techniques that are well known to those of ordinary skill in the art. It should be understood that original data, as used herein, means both that data which is measured, sensed or detected directly in addition to data that may be derived from such measured, sensed or detected data. The main point of distinction is between condensed data (i.e., index data and summary data) and uncondensed data (i.e., original data).

In another embodiment, multiple data collection agents 16 may be coupled to a single database 18. In such an embodiment, however, only one condensing agent preferably condenses data up to the next level, as will be described in detail hereinafter.

Any of databases 18 (there are multiple databases 18 shown in FIG. 1, namely $18_1$, $18_2$, $18_3$) may be of a local desktop database type, for example a Microsoft Jet (Access compatible) type database, or may be a client server database (e.g., a Microsoft SQL server, an Oracle database, an IBM DB2 database, or a Sybase Enterprise server). In alternate embodiment, however, database 18 may comprise any mechanism or structure for storing or maintaining information, such as a flat file, in an agent on the computer, or in any other type of memory (i.e., RAM, ROM). Data collection agent 16 may be configured to maintain a continuous connection with its associated database 18 in order to save system, application usage and user information frequently (real-time). Each database 18 will then be a "source" database for a condensing agent 20, described below.

The original data acquired by collection agent 16 may include CPU usage information, such as average overall CPU utilization, minimum and maximum CPU utilization, utilization in a Kernel mode and in a user mode, respectively. The original data may further include information relating to memory usage, for example, average, minimum, and maximum memory usage for a working set while active, a nominal working set, a peak working set, a peak paged pool, peak non-paged pool, peak page file usage and page faults/second. It should be understood that in addition to the foregoing directly measured information, collection agent 16 may produce and store derived data, such as standard deviation and variance of any of the foregoing monitored parameters. The original data may further include application usage information, such as the name of an application program (i.e., the name of the executable), a count of the number of times the application was run, a start time when the application was loaded and a stop time when the application was terminated, a duration in which the application ran, which may be calculated using the start and stop times or may be separately tracked and recorded, the last time an application was used, and the like. Collection agent 16 may further acquire and store information concerning disk usage and network usage, as well as various system operating parameters. It should be understood that the foregoing is exemplary only, and not limiting in nature.

Condensing agent 20 is configured to condense the original data (as well as perhaps summarized data and index data from lower levels) from a "source" database and to save (i) index data (to be described in greater detail below) and (ii) summarized data (also to be described in greater detail below) into a destination database. The "destination" database, in the preferred embodiment, is a database 18 that is logically higher in the hierarchy of databases than the source database. For purposes of illustration, and with respect to FIG. 1, workstation computer $12_3$ has deployed thereon a data collection agent 16, which acquires and stores original data in database $18_3$. Condensing agent 20 is connected to database $18_3$ and condenses and supplies the summarized data, as well as the index data, upstream to the destination database $18_2$, which is logically higher in the hierarchy of databases. However, the condensing agent 20 coupled to database $18_2$, may operate on both (i) the original data for computer $12_2$, as well as (ii) the index data and summarized data from computers $12_3$, $12_4$ and $12_5$. As shown in FIG. 1, original data flows are shown in solid-line format, while condensed data (index and summary) flows are shown in dashed-line format.

The terms index data and summarized data will now be described. The index data produced by condensing agent 20 identifies the content contained in the "source" database, and associates therewith information sufficient to facilitate access to that source database over the distributed network 14. The access or connection data is provided so that console 22 can retrieve the content. The index data may be used by console 22, or, depending on the depth of the hierarchy, another condensing agent 20 where its "source" database is the "destination" database of the condensing agent 20 immediately downstream.

The summarized data produced by condensing agent 20 is in the nature of summarized information drawn from the original data in the "source" database. For example, this data may relate to application program usage, disk usage, network usage, and system operation information. As mentioned above, the summarized data may also itself incorporate or aggregate summarized data from lower levels in the hierarchy. This feature will be explained in greater detail below, with reference to specific examples.

Condensing agent 20 is configured to perform these activities (i.e., examine the original data collected in its "source" database 18) on a predetermined, periodic basis, not continuous, like the activities of the collection agent 16.

As shown in FIG. 1, console module 22 is coupled to a base or primary database 18, shown as database $18_1$. While the console 22 is shown deployed on the top-level, master node, this is not required for the present invention. Multiple console modules 22 may be deployed in the network 14; however, the information that the console module 22 has available to it will depend on the database 18 to which it is connected, specifically where in the hierarchy such database is located. In general, a database 18 only contains information about the computer system with which it is associated and of computer systems below it in the tree hierarchy. The top-level master node $12_1$ has complete information about all the monitored computers 12 in the distributed network 14 since it sits on the very top. However, database 182 only has information about computers $12_2$, $12_3$, $12_4$ and $12_5$ (i.e., domain A), and not any information about domain B or domain C, since these portions of the distributed network are not below it in the relevant branch of the tree (although they may be considered at the same "level" with respect to top-level master node).

Figure 2:
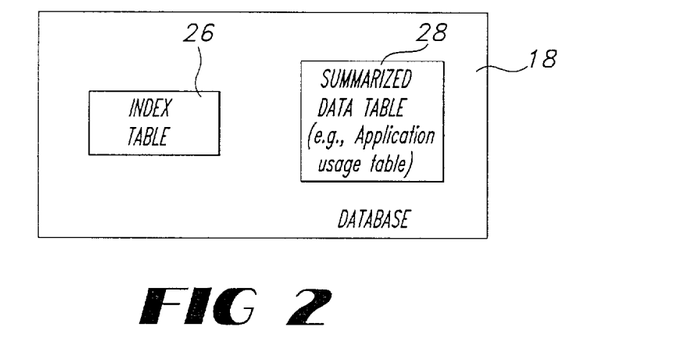
FIG. 2 is a simplified block diagram showing, in greater detail, one of the databases shown in FIG. 1.

FIG. 2 shows database 18 in greater detail. Each database 18 includes (i) an index table 26 that includes index data and (ii) a summarized data table 28, which contains summarized data. It should be understood that at each level in the hierarchy, the condensing agent 20 is operative to pass index data, and summarized data upstream to the next database in the hierarchy. Index data, as well as summarized data, flows from all of the "leaf" or end nodes all the way up to the top-level master node. Thus, the "base" or "primary" database (database $18_1$) in the collection of databases, contains index data and summarized data with respect to all of the monitored computers 12 in the distributed network 14 below it.

Figure 3:
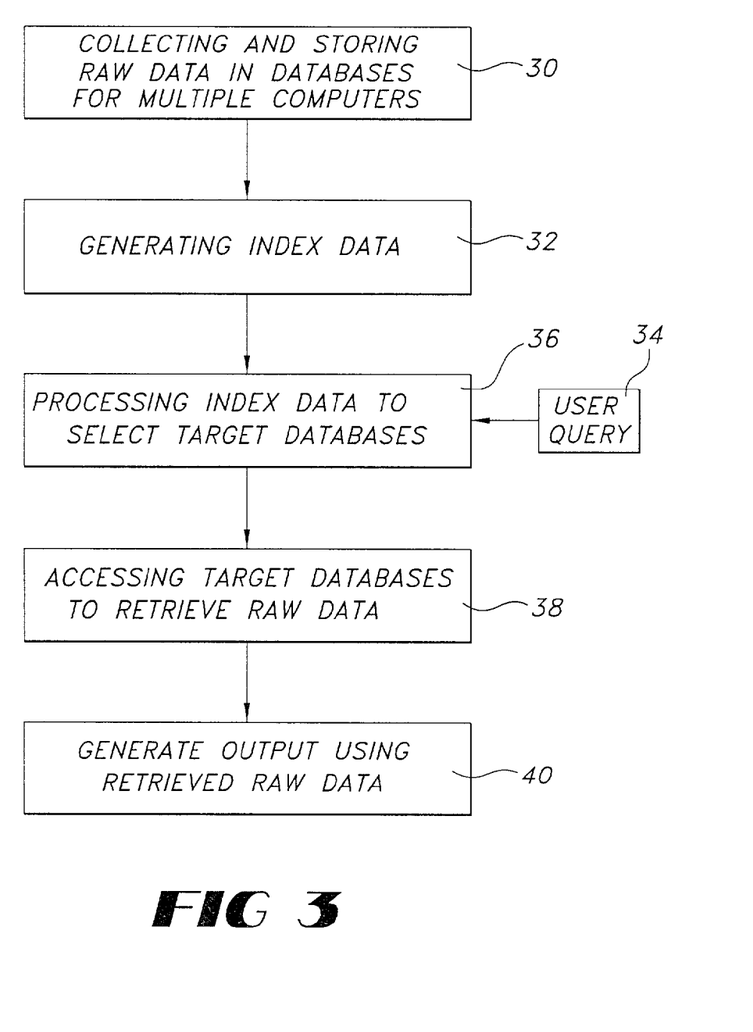
FIG. 3 is a flow chart diagram illustrating a method of using index data according to the invention.

With this in mind, reference is now made to FIG. 3. FIG. 3 shows a method for using the index data to efficiently retrieve information needed to satisfy a user query. The method starts in step 30.

In step 30, the collection agent 16 for each computer acquires and stores original data in a respective database associated with the monitored computer 12. The method then proceeds to step 32.

In step 32, the multiple condensing agents 20 at each level of the tree generate a respective index table including index data for each computer. It should be understood that the index data is generated using both (i) the original data in the database pertaining to the monitored system, and (ii) any previously forwarded index data from lower levels. This process is repeated so that the database 18 associated with the top-level master node in the hierarchy includes the index data for all of the monitored computers 12 in the distributed network 14. The method then proceeds to step 34.

In step 34, a user defines a query, which may contain a variety of search parameters. The search parameter information is passed to step 36.

In step 36, console module 22 is activated to process the index data in the base database (to which it is connected) in order to select target databases that contain information needed to answer the user query. Console module 22, in this processing step, uses the index information from the base database to locate the information in the collection of databases that are logically lower in the hierarchy. The index data is configured and is used so that complex user queries for contents can be answered without the need to connect to all of the databases in the hierarchy (i.e., to determine their contents), as is conventional for directory-style "framework" management systems. For example, a user query that requests a list of applications a user has executed on any system in the distributed network 14 can be efficiently answered by using the index data to locate a short list of target databases in the hierarchy that contain the relevant information regarding the user, and then connecting to only those databases 18 to answer the query. The index data according to the invention is a feature to accomplish efficient navigation of the collection of databases. The method then proceeds to step 38.

In step 38, the console module 22 is configured to access the target databases in order to retrieve the information needed to answer the user query. In this regard, as described above, the index data contains information configured to facilitate access to the databases over the distributed network. In one embodiment, this information comprises a connection string that is compatible with the target database (e.g., SQL database format, Oracle database format, etc.). The method then proceeds to step 40.

In step 40, console module 22 uses the retrieved data to generate an output responsive to the user query. This output, shown in FIG. 1 as output 24, may comprise a formatted screen display or, alternatively, a printed report. Other output forms other than the foregoing are possible, such other outputs being adapted to satisfy the needs of a particular user.

Figure 4:
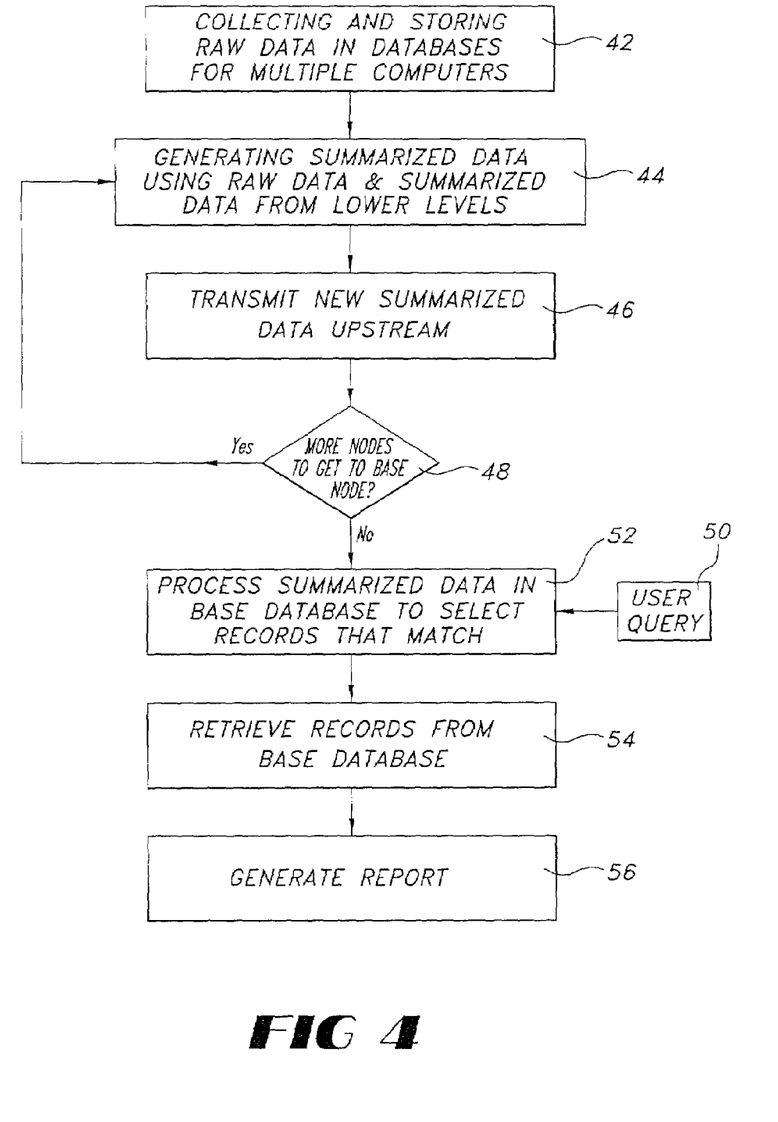
FIG. 4 is a flow chart diagram illustrating a method of using summarized data according to the invention.

FIG. 4 is a flow chart diagram showing another aspect of the present invention relating to "summarized" data. The method begins in step 42.

In step 42, the data collection agent 16 associated with each computer acquires and stores original data in respective databases associated with the computer 12 being monitored. The method then proceeds to step 44.

In step 44, the condensing agent 20, at each level, and for each computer 12 in the distributed network that has been configured with collection agent 16 and condensing agent 20, generates summarized data using (i) original data from the database 18 associated with the monitored system and (ii) summarized data from logically lower levels in the hierarchy. The method then proceeds to step 46.

In step 46, the condensing agent 20 transmits the new summarized data upstream to the destination database, located logically higher in the hierarchy of databases. The method then proceeds to step 48.

In step 48, the question is whether the process of condensing has proceeded far enough up the tree to reach the top-level master node. Decision block 48, it should be understood, is not performed necessarily by any one particular condensing agent, but rather is included in FIG. 4 to illustrate the logic of how the entire hierarchy of databases is condensed and information is passed, level by level, upwards. It should be understood that the flowchart is not intended to suggest that processing occur only at the lowest level first, then to proceed upward in the tree. Indeed, the condensing agents may operate asynchronously. Ultimately, the top level computer, which executes console module 22, has access, via its "base" database, to summarized information for all the monitored computer systems in the entire distributed network 14. If there is further condensing to be done, then the method branches back to step 44. However, if the entire hierarchy of databases has been condensed, then the method proceeds to step 50 and 52.

In step 50, a user formulates a query wherein certain search parameters are defined, and which is passed to step 52.

In step 52, console module 22 processes the summarized data in the base database 18 and selects records, for example, found in a summarized data table in the base database, that satisfies the user query. In accordance with the invention, there is no need for console module 22 to make connections throughout the distributed network 14 in order to answer the query. All of the necessary information may be found in the summarized data contained in the base database 18. For example, some queries posed might, by their nature, require connections to a very large number of databases (i.e., expressed as a percentage or in absolute terms). For example, a user query that requests a list of all users of a commonly used application (e.g., Microsoft Word word processor) might require access to nearly every database 18 in the hierarchy of databases. In order to avoid such queries, as would be required in the art for a "framework" management system, condensing agent 20 stores summary information upwards in the tree that aggregates certain kinds of data by group, system, and/or user or combination thereof. Queries that would otherwise be to inefficient to process and answer in a large enterprise can be easily answered according to the invention using summarized data records that are "moved up" in the hierarchy. This feature of the invention will be described in greater detail below with reference to specific examples. The method then proceeds to step 54.

In step 54, console module 22 retrieves the records containing summarized data from the base database. The method then proceeds to step 56.

In step 56, console module 22 generates an output report, designated as output 24 in FIG. 1.

Figure 5:
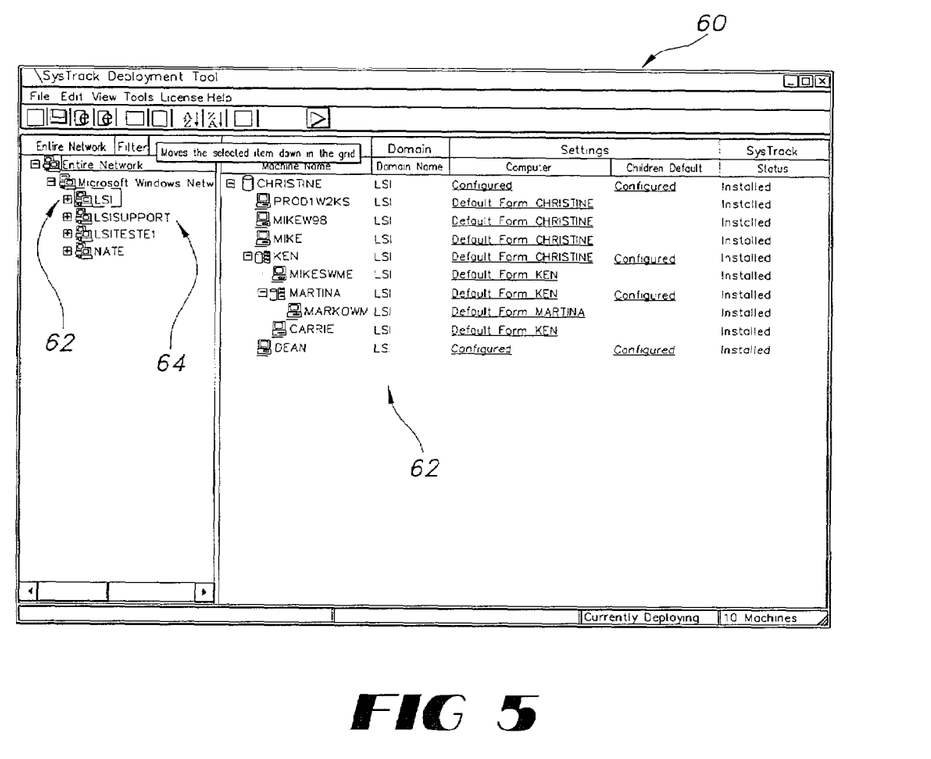
FIG. 5 is an exemplary screen display of a hierarchy of databases according to the invention.

FIG. 5 shows a screen display 60 illustrating a sample deployment of a distributed network according to the present invention. Display 60 is shown having a left pane and a right pane providing details of selections made in the left pane. The left pane shows a distributed network having various domains, such as a first domain 62, labeled as domain "LSI", and a second domain 64, labeled as domain "LSI SUPPORT". The right pane shows, in greater detail, the hierarchical structure of the computers of domain LSI. The computer designated "CHRISTINE" is the top-level master node, and is considered the top or first level in the hierarchy.

At the second level, in display 60, there is shown five computers designated "PROD1W2KS", "MIKEW98", "MIKE", "KEN" and "DEAN". Of the computers at the second level, the computer designated "KEN" is acting in the role of a parent node, with the remainder of the computers acting in the role of a child node.

At the third level, in display 60, there is shown three computers designated "MIKESWME", "MARTINA" and "CARRIE". The computer designated "MARTINA" is acting in the role of a parent node, while the rest of the computers at the third level are acting in the role of a child node.

At the fourth level of the hierarchy, in display 60, there is one computer designated "MARKOWM", which is acting in the role of a child node.

Figure 6:
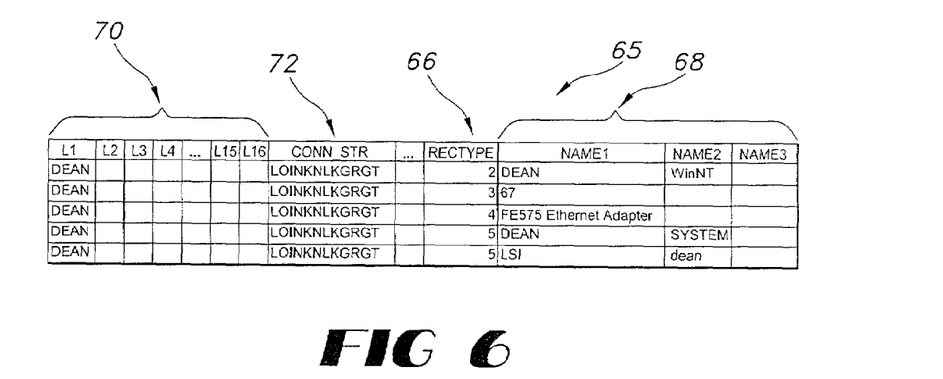
FIG. 6 is a simplified block diagram view showing, in greater detail, the index table of FIG. 2 for a bottom-level (child) node in the hierarchy.

FIG. 6 shows, in greater detail, an index table 65 for the computer designated "DEAN" in the display 60 of FIG. 5. Computer "DEAN" is a child node in the hierarchy. Index table 65 is contained in a database 18 associated with computer "DEAN." Were there any computers below computer "DEAN" in the tree, any index data passed upstream to computer "DEAN" from lower levels would also appear here (but is not applicable in this case). Index table 65 includes a record type field 66, one or more name fields, collectively referred to as name field 68, a plurality of fields, L1, L2, L3, . . . Ln where n equals the depth of the tree, collectively referred to as fields 70, and a connection string field 72.

Record type field 66 contains data indicative of the type of record for index table 65. In a constructed embodiment, five record types are provided for, although only four record types are shown in FIG. 6 for computer "DEAN." Of course, more or less record types could be established and remain within the spirit and scope of the present invention.

A first record type (hereinafter Type "1") specifies information about the databases 18 contained within the subtree headed by the particular database 18 containing the subject index table itself. In this regard, fields 70 labeled L1, L2, . . . Ln are also included in each record, where each field Lx names a level in the hierarchy of databases 18. The value n represents the depth of the subtree. The fields apply to all record types 1, 2, 3, 4 and 5. In the illustrated embodiment of FIG. 6, there is shown fields to support sixteen levels in the hierarchy. Field L1 represents the top-most level in the subtree, which contains the name of the database 18 that contains this index table, field L2 represents the name of the database at the next lower level, and so on. By examining these records (e.g., type "1" records), the console module 22 may be configured to reconstruct the complete hierarchy of the subtree of databases.

The second record type (hereinafter Type "2") specifies the name of a system whose original data is held in one of the databases 18 contained in the subtree. In the example of FIG. 6, there exists a "type 2" record. The "type 2" record specifies a computer system named "DEAN" (this is under field designated "NAME1"), which is a Windows NT-based system (under the field designated "NAME2"). The name of the computer system is thus found in field 68. The name of the database 18 that holds the data for that system is found in the plurality of fields 70 for this record type. It bears emphasizing that the level stated in the field names of fields 70 are not absolute, but rather are relative to the level at which the database 18 exists in the subtree. For example, as shown in FIG. 6, "DEAN" is shown as being at level 1, although clearly, as shown in FIG. 5, "DEAN" is at the second level in the overall hierarchy of databases (computer "CHRISTINE" being at the first level). Nonetheless, as to the index table 65 for computer "DEAN," "DEAN" will be named at level 1. These record types may be used by console module 22 to locate the databases 18 in the subtree to allow access and process a query. That is, the console 22 can connect to any index table in the tree and have access to full information regarding the subtree.

A third record type (hereinafter Type "3") specifies the name of a disk system whose original data is held in the databases 18 in the subtree. In FIG. 6, for example, the "Type 3 Record" shows a name of "67," which designates a C: drive in a system. Information regarding disk "67" on computer "DEAN" is found in the local database 18.

A fourth record type (hereinafter Type "4") specifies the name(s) of network interfaces whose data is held in the databases 18 in the subtree. In FIG. 6, a ("Type 4") record is shown, wherein the network interface is named "FE575 ETHERNET ADAPTER" in name field 68.

A fifth record type (hereinafter "Type 5") specifies the names of users who, in one embodiment, have executed at least one application program on a system in the subtree. These record types are used to locate target databases 18 that need to be connected to, and accessed, in order to retrieve original data to answer queries about user activity. As shown in FIG. 6, there are two "Type 5" records. The first lists the user called "DEAN/SYSTEM", and the second is "LSI/ dean". Note that on the computer system 12 named "DEAN" there are considered at least two users: One is the human user named "dean" logged into the domain "LSI", and the second user is the system itself, which, as well-known to those of ordinary skill in the art, is conventionally configured to run various application programs, system services, and the like.

With the continued reference to FIG. 6, the connection string field 72 is used by console module 22 in order to connect directly with the particular database 18 specified in the naming fields L1, L2, . . . L16. This connection string 72 is encrypted for security purposes, in a constructed embodiment. In an alternate embodiment, however, multiple connection strings may be associated with a record in order to allow for database replication or alternate ways to connect to the database.

Figure 7:
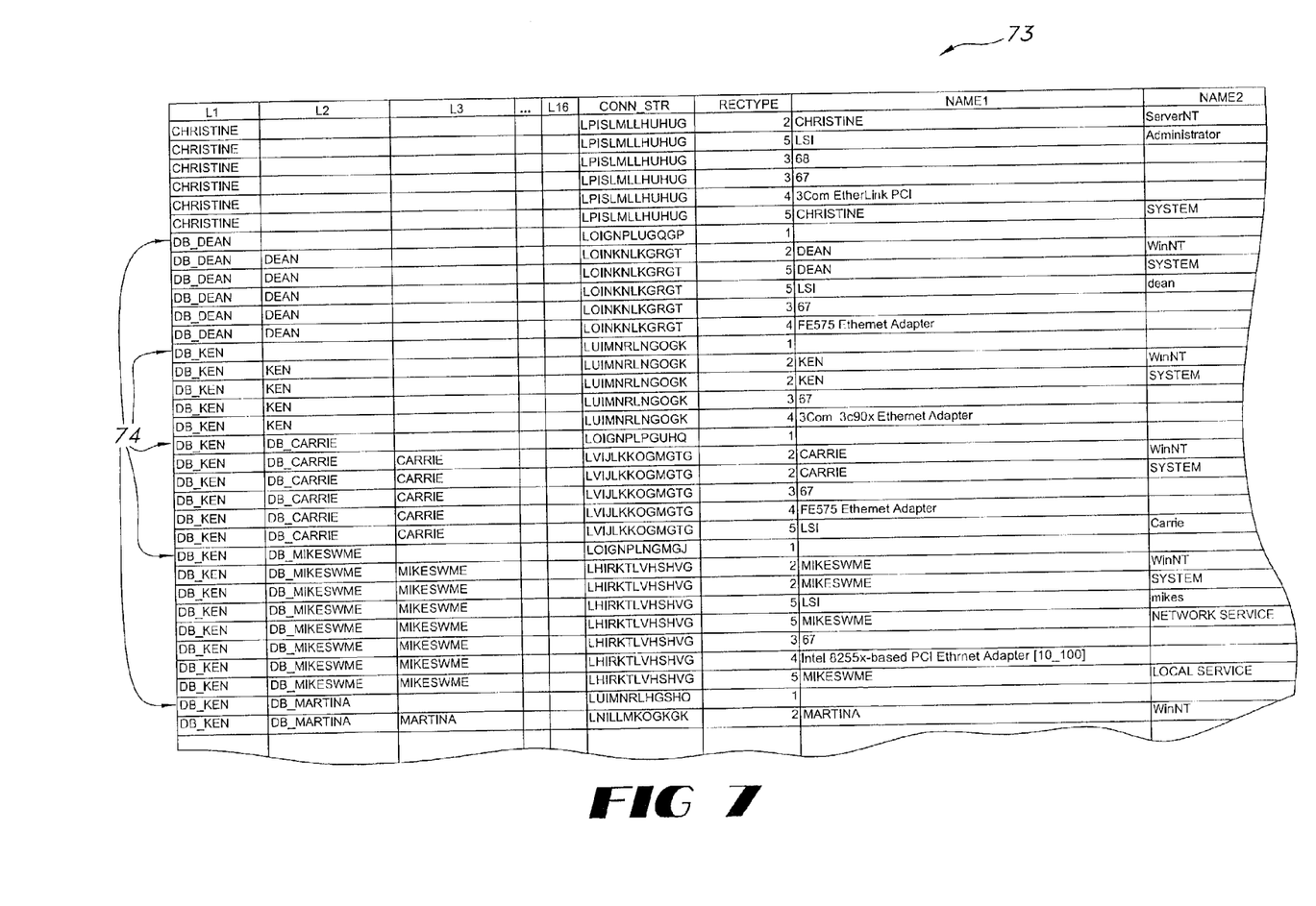
FIG. 7 is a simplified block diagram showing, in greater detail, the index table of FIG. 2 for a top-level master node in the hierarchy.

FIG. 7 is an excerpt from an index table 73 associated with a top-level master node corresponding to the computer system named "CHRISTINE" in FIG. 5. The console module 22 associated with computer "CHRISTINE" makes an initial connection to the base database associated therewith (e.g., such as database $18_1$ associated with a top-level master node $12_1$, shown in FIG. 1). Console module 22 is configured to use the index data contained in Type 1 records, which are designated as records 74 in FIG. 7, to reconstruct the subtree of the distributed network 14 in a hierarchical fashion. This subtree may then be shown as screen display 60 of FIG. 5, for example. The Type 2, Type 3, and Type 4 record types are used to display the computer systems, disks, and network interfaces, respectively, in the hierarchy at the correct locations, (i.e., at correct levels, and in the correct branches).

The architecture of the index tables shown and described above provides an extremely efficient way for console module 22 to connect to a limited number of databases 18 in order to resolve user queries. That is, the index tables allows the collection of databases 18 to be queried as a whole from the user perspective via console 22, while minimizing the actual number of databases that must be queried thereby preserving efficiency.

Notwithstanding the foregoing, certain types of queries cannot practically be efficiently handled using the index mechanism above. More particularly, this situation occurs where a relatively high percentage of the databases (on large number of databases in absolute terms) in the subtree contain relevant data, and resolving the query would require connection to all of these databases. In a second aspect of the present invention, to resolve these queries, certain types of data are summarized from the lower levels and then sent, level-by-level, on up to the top most node of a given subtree. The summarization process may take varying forms, depending on the nature of the data being summarized, but may include mathematical averaging, determination of minimums and maximums values, and summation of values. The process involves aggregating the data from a large number of records at one level to form a single record (or a small number of records) to be passed on up to the next level.

Figure 8:
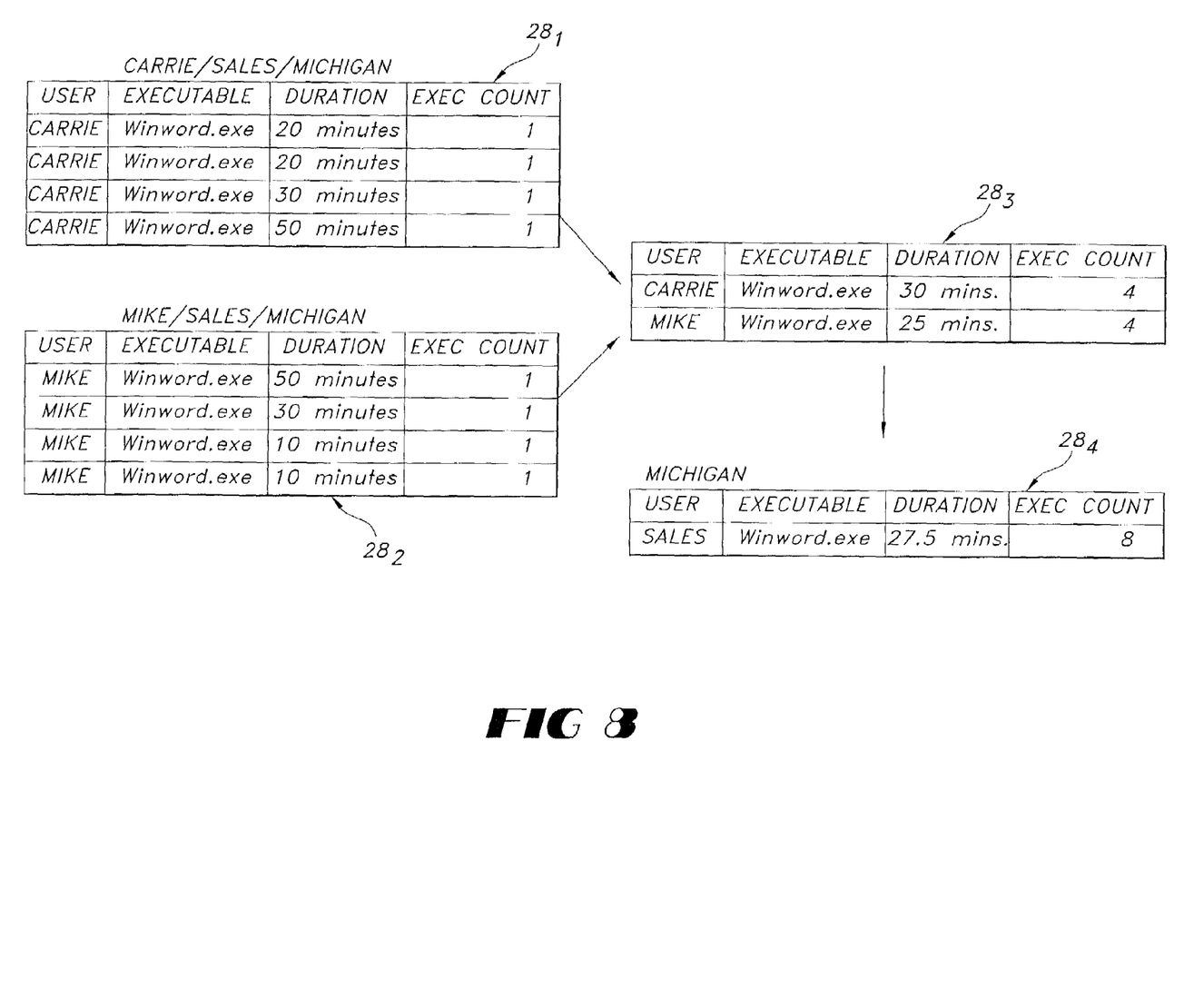
FIG. 8 shows, in greater detail, the summarized data table of FIG. 2, and a method of condensing data according to the invention.

FIG. 8 shows an example of one summarization process performed by condensing agent 20. The example involves application program usage data, although it should be understood that the summarization approach can be applied to a wide variety of data types. FIG. 8 shows a plurality of application tables $28_1$, $28_2$, $28_3$, and $28_4$ each including application program usage data. In addition, in the example to be described, it is assumed that a human user named "CARRIE", and a human user named "MIKE" both work in a sales department in a Michigan region (e.g., domain) of an organization. In FIG. 8, one record per domain/user/application combination is summarized, and aggregated up to the next level. As shown in application usage table $28_1$, user "CARRIE/SALES/MICHIGAN" ran the executable WINWORD.EXE ("Microsoft WORD" word processor) four times. The application usage data for this combination is, as shown, averaged by condensing agent 20 and only one record for that executable will appear in the aggregated database $28_3$ that is one level up in the hierarchy of databases. Also note that the user MIKE/SALES/MICHIGAN, whose application table $28_2$ also contains four instances of WINWORD.EXE, is also aggregated and summarized to just one record in the application table that is one level up in the hierarchy. The information in table $28_3$ is therefore summarized data corresponding to the activity below it in the hierarchy. Note that the execution count (designated "EXEC COUNT" in the figures) reflects the total number of times that the application has been run.

Preferably, the information in table $28_3$ is sent up to the next level, maintaining one record per domain/user/application.

However, in an alternates embodiments, other attributes may be used during summarization, obtaining increased levels of condensation. For example, the data in the application table $28_3$ may be aggregated up one level to application table $28_4$, based on the attribute of being in "SALES". Note, that the duration parameter is further averaged, and reduced to a single record. Note the mathematical averaging of the duration of use of the application program as the condensing operation progresses through the different levels. Also note that the execution count in the application table $28_4$ reflects the total number of times (i.e., summation operation that all the users have run the application program. Condensing agent 20, of course, may also be configured to summarize other aspects of the application program usage, as well as other types of data as well.

Once console module 22 connects to a base database that contains application usage table $28_4$, it can answer certain user queries without having to drill down and connect to each monitored computer. This overcomes limitations in the art.

Another example of summarization involves an application resource requirement. For example, it is common in an enterprise for computers to use the same e-mail client (e.g., Microsoft OUTLOOK). Thus an administrator may wish to know the average memory utilization for OUTLOOK. This would require connection to nearly all of the computers 12 in the distributed network 14, even using the index approach of the present invention. However, using the summarization feature of the present invention, the requested information is summarized and is sent up, level-by-level, and is available to console 22. Thus, seemingly broad queries can be answered with a reduced amount of network connection and traffic.

It should be understood that the foregoing is exemplary only, and not limiting in nature. As described above, there exists a variety of information that may be summarized, either through averaging, maintaining of the minimum or maximum values, weighted averaging, or the like. The feature is that as data is summarized from one level to the next level upstream, the number of records is reduced, to maintain a manageable number of records across the distributed network. Through the foregoing, console module 22 is able to answer user queries extremely efficiently, without having to connect to a large number of databases.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof. For example, while the system 10 of the present invention has been described as presenting a user interface that provides no indication that the collection of databases are being accessed via dual mode operation (i.e., the index mode and the summary mode), such need not be the case. In an alternate embodiment, the mode of operation is user selectable. The console may be further configured to present preliminary information that the user may use to aid in his selection (e.g., the number of databases that would be accessed via the index mode of operation to answer the query). In a still further alternate embodiment, the mode of operation may be switch between the index method and the summary method at a predetermined crossover (e.g., the number of database that would have to be accessed).

What is claimed is:

1. A method of managing information for a plurality of computers in a distributed network comprising the steps of:
   (A) collecting original data related to each computer and storing the original data in a respective database;
   (B) generating an index table including index data for each computer wherein the index data is configured (i) to identify at least a portion of the contents of the original data stored in the database, and (ii) to facilitate access to the databases over the distributed network;
   wherein said step of generating an index table includes the substeps of:
   producing records in the table characterized by a record type selected from the group comprising a database name, a system name, a disk name, a network interface name and a user name; and
   producing connection information for each database to facilitate access thereto over the distributed network; and
   (C) scanning at least one of the index tables to select databases that match a user query;
   (D) accessing the selected databases to retrieve original data and generate an output therefrom.

2. The method of claim 1 wherein said accessing step includes the substep of:
   using respective connection information to connect to and access the corresponding database.

3. A method of managing information for a plurality of computers in a distributed network comprising the steps of:
(A) collecting original data related to each computer and storing the original data in a respective database;
(B) generating an index table including index data for each computer wherein the index data is configured (i) to identify at least a portion of the contents of the original data stored in the database, and (ii) to facilitate access to the databases over the distributed network;
(C) selecting databases by scanning index tables and determining which ones, using the index data configured to identify the contents of the original data stored in the databases, contain original data that match a user query;
(D) accessing the selected databases to retrieve original data and generate an output therefrom;
the method further comprising the step of:
producing a summarized data table for the computers, wherein said plurality of computers are organized in a tree-style hierarchy, the step of producing the summarized data table includes the substep of:
condensing original data from databases that are lower in the hierarchy to produce the summarized data and passing the summarized data upstream to databases for storage therein.

4. The method of claim 3 wherein said steps of scanning and accessing define a first mode of operation, said method further comprising the step of accessing a summarized data table at a base level in the hierarchy having the summarized data thereby avoiding access to one or more databases lower in the hierarchy.

5. The method of claim 4 wherein the summarized data table comprises at least one of application resource information or application usage information.

6. An apparatus for managing information for computers in a distributed network comprising:
a collection agent associated with each of a plurality of computers configured to acquire and store original data in a respective storage databases;
at least one condensing agent for condensing said original data into index data, said index data configured (i) to identify at least a portion of the contents of said original data, and (ii) to facilitate access to said storage databases over the distributed network;
a base database including said index data;
a console module configured to select storage databases for access thereto responsive to a user query for said contents, said console being further operative to use said index data to access said selected storage databases, retrieve original data, and generate an output;
said plurality of computers are arranged in a logical tree style hierarchy wherein said console module is configured to execute on a head end of said hierarchy, a remainder of said computers populating a subtree of said hierarchy at a plurality of levels;
wherein said base database includes an index table having a plurality of records containing said index data, each record being characterized by a record type selected from the group comprising a storage database name, a system name, a disk name, a network interface name and a user name.

7. The apparatus of claim 6 wherein each record of said index table further includes a first plurality of fields each corresponding to a level in said subtree, said first plurality of fields collectively describing one of said storage databases and a corresponding level in said subtree.

8. The apparatus of claim 6 wherein each record of said index table further includes at least one further field comprising connection information for facilitating access to said storage database identified in said first plurality of fields.

9. The apparatus of claim 8 wherein records in said index table having said record type corresponding to said storage database names identify said storage databases contained in said subtree.

10. The apparatus of claim 8 wherein said records in said index table having said record type corresponding to said system names identify systems whose original data associated therewith is included in at least one of said storage databases in said subtree.

11. The apparatus of claim 8 wherein said records in said index table having said record type corresponding to said disk names identify disks whose original data associated therewith is included in at least one of said storage databases in said subtree.

12. The apparatus of claim 8 wherein said records in said index table having said record type corresponding to said network interface names identify network interfaces whose original data associated therewith is included in at least one of said storage databases in said subtree.

13. The apparatus of claim 8 wherein said records in said index table having said record type corresponding to said user names identify users who have executed an application program and whose original data associated therewith is included in at least one of said storage databases in said subtree.

14. An apparatus for managing information for computers in a distributed network comprising:
a first database configured to store original data related to a first computer;
a condensing agent coupled to said first database and configured to generate summarized data based on said original data;
a base database having a first portion configured to store said summarized data and a second portion configured to store index data comprising at connection information of said first database; and
a console module coupled to said base database and configured for operation in (i) a first mode to generate a first output based on said summarized data and (ii) a second mode wherein said console module uses said connection information in said index data to facilitate access to said first database to generate a second output;
wherein said first portion of said base database comprises an application table having information relating to usage of application programs;
wherein a plurality of application programs are executed on said first computer by a user, said application table comprising a corresponding plurality of records, one for each application program and user combination, each record having summarized data comprising statistical information regarding such use of said application programs.

15. The apparatus of claim 14 wherein said statistical information includes one selected from the group comprising a counting indicating the number of times an executable has run, a start time when running of the executable began, a start time when running of the executable was terminated, a run duration of the executable, a CPU time indicative of an amount of time used to run said executable, and a measure of an amount of memory used by said executable.

* * * * *